Aug. 7, 1934.  M. D. VARNEY  1,969,632
WEIGHING SCALE
Filed Sept. 4, 1928
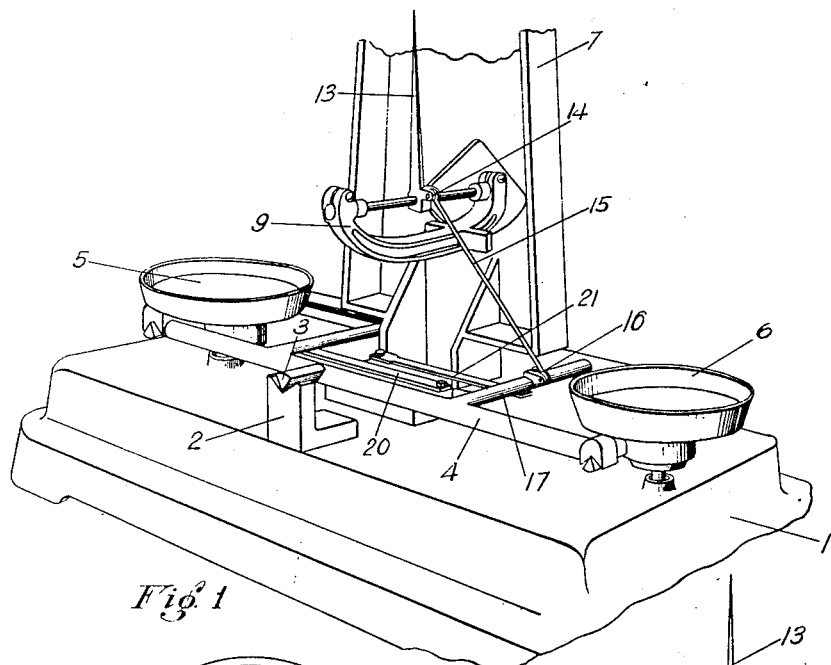
Fig. 1
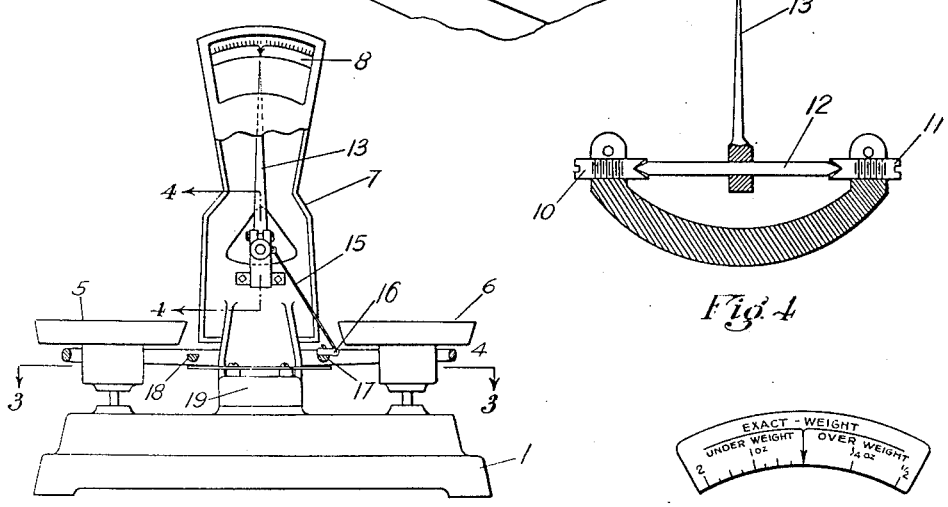
Fig. 2
Fig. 4
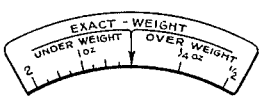
Fig. 5
Fig. 3
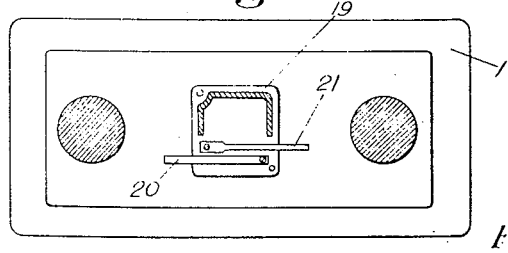
INVENTOR.
Manford D. Varney.
ATTORNEYS.

UNITED STATES PATENT OFFICE 1,969,632

WEIGHING SCALE

Manford D. Varney, Columbus, Ohio, assignor to The Exact Weight Scale Company, Columbus, Ohio, a corporation of Ohio Application September 4, 1928, Serial No. 303,696

4 Claims. (Cl. 265—59)

My invention relates to weighing scales. It has to do, particularly, with that type of scale generally known as the over and under weight scale, although it is not necessarily limited thereto.

My invention is particularly applicable to that type of scale embodying an even-balanced lever utilized in conjunction with an indicator and a dial having a zero position to indicate equilibrium and calibrations on either side of said zero position to indicate the degrees of approach of the load into balancing relation to a counterweight or to indicate the extent to which the load overbalances the counterweight. In this type of scale, the resistance to movement of the scale beam out of balanced position and, consequently, the resistance to movement of the indicator away from zero position is ordinarily effected by resilient means.

In the past, in scales of this general type, it has been customary to provide a structure whereby the resistance to movement of the scale lever and its indicator away from balanced and zero positions has been equal in amount, regardless of whether such movement might be toward over-weight or under-weight indication. In some cases, a single torsion spring has been utilized and so connected to the lever as to offer equal resistance to movement in either direction away from zero position.

I have conceived the idea that it is preferable to have the indicator approach its zero position slowly from the under-weight side of the scale and to move rapidly when the load weight becomes greater than the offsetting weight. Therefore, while I have provided a resilient means to resist movement of the lever in a direction to carry the indicator toward under-weight position and have also used a resilient means to resist movement of the lever in a direction to carry the indicator toward over-weight position, these resilient means are independent of each other. Furthermore, the resilient means which resists movement of the lever in a direction to carry the indicator toward over-weight position is generally weaker than the resilient means which is used to resist movement of the lever in a direction to carry the indicator toward under-weight position. The result is that, although the indicator will move slowly from under-weight position to zero position as the under-weight condition is corrected, it will move much more rapidly as soon as it passes zero position and begins to move into over-weight position.

More specifically stated, I preferably use an even-balance lever which is connected to an indicator operating in proper relation to an over and under-weight dial. In this preferred structure, two flexible springs are disposed immediately beneath the lever and on opposite sides of the fulcrum of this lever. The flexible spring beneath the weight pan side of the lever is of a properly selected strength. The flexible spring beneath the load pan side of the lever is considerably weaker. Furthermore, the dial which I utilize is preferably so calibrated that the indicator will travel a greater distance to show a given over-weight than it will to show the same under-weight.

The preferred embodiment of my invention is shown in the accompanying drawing wherein similar characters of reference designate corresponding parts and wherein:

Figure 1 is a perspective view of a portion of a scale structure embodying my invention.

Figure 2 is a front elevation, partially broken away, of a scale structure embodying my invention.

Figure 3 is a section taken on line 3—3 of Figure 2.

Figure 4 is a detail view showing the preferred manner in which I mount the pivotal support for my indicator.

Figure 5 is a front elevation of a special dial which I preferably use in the structure of scale embodying my invention.

In the drawing, my scale is shown as comprising a base 1 having upstanding bearings 2 for the reception of knife-shaped trunnions 3 of the scale lever 4. This scale lever 4 is provided at one end with a weight pan 5 and at the other end with a commodity pan 6. The scale is, likewise, equipped with suitable check rods, dash pots, and other customary appurtenances.

The base of the scale is preferably provided with a tower 7 carrying a dial 8. This tower 7 is also preferably constructed to support a yoke 9 having threaded thrust bearings 10 and 11, these bearings being adjustable toward or from each other. These bearings are designed to receive an oscillatable shaft 12 upon which is rigidly mounted an indicator 13. The yoke is so disposed within the tower and the indicator is so mounted thereon that this indicator will extend into cooperative relation with the dial 8.

The indicator 13 is preferably directly connected with the lever by means of a lug 14, or other suitable means, formed upon the indicator or shaft, a rod 15 pivoted to this lug 14, or other suitable means, and a lug 16 secured to a crossbar 17 of the scale lever.

The scale lever is preferably provided with a cross-bar 18 similar to the cross-bar 17. Centrally disposed upon the base 1 of the scale, is a platform 19 and this platform 19 is equipped with independent flexible strips 20 and 21. These flexible strips 20 and 21 are each secured at one end and extend in opposite directions in parallelism with the lever.

The flexible strip 20 extends beneath and in close juxtaposition to the lower side of the cross-bar 18. The flexible strip 21 may be of lighter material than the flexible strip 20 and extends beneath and in close juxtaposition to the lower side of the cross-bar 17. The flexible strip 20 tends to resist downward movement of the weight-pan end of the scale lever and also assists somewhat in its return toward normal position of balance. The flexible strip 21 tends to resist downward movement of the load-pan end of the scale lever and, also, assists somewhat in its return to normal position of balance. However, if the flexible strip 21 is of a lighter composition, it will offer substantially less resistance to the downward movement of the load-pan end of the scale lever, with the result that the application of over-weight to the load-pan end of the scale lever produces a comparatively sudden downward movement of this load-pan end and, consequently, a comparatively sudden and exaggerated movement of the weight indicator into position indicating over-weight.

As shown in Figure 5, that side 23 of the dial which indicates over-weight is calibrated differently from that side 24 of the dial which indicates under-weight. In the case of over-weight, the indicator must travel a greater distance to indicate a given excess weight than it would travel in the case of under-weight to indicate a given shortage of weight.

It will be understood that the independent resilient members 20 and 21 serve to initiate the movement of the lever toward balanced position when the load weight and the counterbalance weight begin to be approximately equal. For example, if there is a counterweight of sixteen ounces on the weight pan, the spring beneath the weight pan may be of such strength as to initiate lifting of the weight pan when the load reaches fourteen ounces. This lifting operation progresses as the load on the load pan is increased, until this load exactly counterbalances the counterweight, at which time the resilient members become ineffective. However, if the load is increased to such an extent that it becomes greater than the counterweight on the weight pan, an overload condition exists and the downward movement of the load pan as well as the movement of the indicator into overload position is resisted by the spring beneath the load pan. However, this spring beneath the load pan being a relatively weak spring, permits a comparatively sudden downward movement of the load pan and, similarly, a comparatively rapid and lengthy movement of the indicator. This latter movement produces an exaggerated showing of the over-weight condition and, as previously pointed out, the over-weight side of the dial is especially calibrated to measure and disclose the exact extent of this over-weight condition.

There are numerous features of advantage of my invention. One of these features is the attainment of a sudden and exaggerated movement of the indicator to show over-weight condition. Another feature is the dial structure with calibrations on the over-weight side of the zero line that differ from the calibrations on the under-weight side of such line. Still another feature consists in the use of a plurality of independent resilient means, regardless of whether or not these resilient means are of different strength. Various other features of my invention will appear by reference to the claims of this application.

Having thus described my invention, what I claim is:

1. A weighing scale comprising a lever, resilient members which are independent of each other, one resisting downward movement of the load side of said lever and the other resisting downward movement of the weight side of said lever, one of the said members being weaker than the other of said members in a predetermined ratio.

2. In a weighing scale, a lever, an indicator, an over and under weight dial having a zero indication, and having calibrations on both the under weight and the over weight side of such zero indication, the calibrations on the over weight side being such that a greater space is provided for a given unit of weight than the space provided for the same unit of weight by the calibrations on the under weight side, and means resisting movement of said lever and said indicator away from zero position, the said last named means being such that the said lever and indicator will move a greater distance for a given unit of weight upon the over weight side of the dial than upon the under weight side of the dial.

3. In a weighing scale, a lever, an indicator, an over and under weight dial having a zero indication, and having calibrations on both the under weight and the over weight side of such zero indication, the calibrations on the one side of the dial being such that a greater space is provided for a given unit of weight than the space provided for the same unit of weight by the calibrations on the other side of the dial, and means resisting movement of said lever and said indicator away from balanced position, the said last-named means being such that the said indicator will move a greater distance for a given unit of weight on the first-mentioned side of the dial having the greater spaces than upon the other side of the dial.

4. In a weighing scale, a lever, an indicator, an over and under weight dial having a zero indication, means for resisting movement of the load side of said lever and for resisting movement of the weight side of said lever, said means being of such a type that the indicator will be caused to move through a greater distance on one side of the dial to indicate a given unit of weight than it will on the other side of the dial to indicate the same unit of weight.

MANFORD D. VARNEY.